United States Patent
He et al.

(10) Patent No.: US 8,524,402 B2
(45) Date of Patent: Sep. 3, 2013

(54) ELECTRICITY GENERATION USING MICROBIAL FUEL CELLS

(75) Inventors: Zhen He, Los Angeles, CA (US); Kenneth H. Nealson, Los Angeles, CA (US); Florian Mansfeld, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 514 days.

(21) Appl. No.: 12/464,689

(22) Filed: May 12, 2009

(65) Prior Publication Data

US 2011/0183159 A1    Jul. 28, 2011

Related U.S. Application Data

(60) Provisional application No. 61/052,850, filed on May 13, 2008.

(51) Int. Cl.
*H01M 8/16* (2006.01)
*C02F 3/00* (2006.01)
*C02F 1/72* (2006.01)

(52) U.S. Cl.
USPC .......................................... 429/401; 210/601

(58) Field of Classification Search
USPC .................................................... 429/401, 2
See application file for complete search history.

(56) References Cited

U.S. PATENT DOCUMENTS

| | | | |
|---|---|---|---|
| 5,976,719 A | 11/1999 | Kim et al. | |
| 6,913,854 B1 | 7/2005 | Alberte et al. | |
| 7,160,637 B2 | 1/2007 | Chiao et al. | |
| 2005/0095466 A1 | 5/2005 | Minteer et al. | |
| 2006/0011491 A1 | 1/2006 | Logan et al. | |
| 2006/0234110 A1 | 10/2006 | Bergel | |
| 2008/0090736 A1 | 4/2008 | Zhao et al. | |
| 2008/0213632 A1 | 9/2008 | Noguera et al. | |
| 2010/0040908 A1 | 2/2010 | Nealson et al. | |
| 2010/0196742 A1 | 8/2010 | Nealson et al. | |
| 2011/0229775 A1 | 9/2011 | Michaels et al. | |

FOREIGN PATENT DOCUMENTS

| | | |
|---|---|---|
| JP | 56 016864 | 2/1981 |
| WO | WO 2006/099220 | 9/2006 |
| WO | WO 2006099220 A2 * | 9/2006 |
| WO | WO 2008036347 | 3/2008 |
| WO | WO 2008/109911 | 9/2008 |
| WO | WO2008112371 A3 | 11/2008 |
| WO | WO 2009009214 | 1/2009 |
| WO | WO 2009/140428 | 6/2009 |
| WO | WO2010088626 A3 | 8/2010 |

OTHER PUBLICATIONS

Complete Genome Sequesnce of the Ammonia-Oxidizing Bacterium and Obligate Chemolithoautotroph *Nitrosomonas europaea*; Patrick Chain, Jane Lamerdin; Journal of Bacteriology; May 2003; p. 2759-2773.*

Camargo, J. A. and A. Alonso, "Ecological and toxicological effects of inorganic nitrogen pollution in aquatic ecosystems: A global assessment," Environment International 32: 831-849 (2006).
Doane, T.A. et al., "Spectrophotometric determination of nitrate with a single reagent," Analytical Letters 36(12): 2713-2722 (2003).
Ferris, M.J. et al., "Denaturing gradient gel electrophoresis profiles of 16S rRNA-defined populations inhabiting a hot spring microbial mat community," Applied Environmental. Microbiology. 62: 340-346 (Feb. 1996).
GenBank Nucleotide Accession No. FJ418973, "Uncultured *Nitrosomonas* sp. isolate DGGE gel band 1 16S ribosomal RNA gene, partial sequence," http://www.ncbi.nlm.nih.gov/nuccore/212725762, 2 pages (accessed Jul. 27, 2009).
GenBank Nucleotide Accession No. FJ418974, "Uncultured beta proteobacterium isolate DGGE gel band 3 16S ribosomal RNA gene, partial sequence," http://www.ncbi.nlm.nih.gov/nuccore/212725763, 2 pages (accessed Jul. 27, 2009).
GenBank Nucleotide Accession No. FJ418975, "Uncultured beta proteobacterium isolate DGGE gel band 4 16S ribosomal RNA gene, partial sequence," http://www.ncbi.nlm.nih.gov/nuccore/212725764, 2 pages (accessed Jul. 27, 2009).
GenBank Nucleotide Accession No. FJ418976, "Uncultured beta proteobacterium isolate DGGE gel band 7 16S ribosomal RNA gene, partial sequence," http://www.ncbi.nlm.nih.gov/nuccore/212725765, 2 pages (accessed Jul. 27, 2009).
GenBank Nucleotide Accession No. FJ418977, "Uncultured beta proteobacterium isolate DGGE gel band 8 16S ribosomal RNA gene, partial sequence," http://www.ncbi.nlm.nih.gov/nuccore/212725766, 2 pages (accessed Jul. 27, 2009).
GenBank Nucleotide Accession No. FJ418978, "Uncultured gamma proteobacterium isolate DGGE gel band 9 16S ribosomal RNA gene, partial sequence," http://www.ncbi.nlm.nih.gov/nuccore/212725767, 2 pages (accessed Jul. 27, 2009).
GenBank Nucleotide Accession No. FJ418979, "Uncultured gamma proteobacterium isolate DGGE gel band 10 16S ribosomal RNA gene, partial sequence," http://www.ncbi.nlm.nih.gov/nuccore/212725768, 2 pages (accessed Jul. 27, 2009).
GenBank Nucleotide Accession No. FJ418980, "Uncultured gamma proteobacterium isolate DGGE gel band 11 16S ribosomal RNA gene, partial sequence," http://www.ncbi.nlm.nih.gov/nuccore/212725769, 2 pages (accessed Jul. 27, 2009).
GenBank Nucleotide Accession No. FJ418981, "Uncultured beta proteobacterium isolate DGGE gel band 12 16S ribosomal RNA gene, partial sequence," http://www.ncbi.nlm.nih.gov/nuccore/212725770, 2 pages (accessed Jul. 27, 2009).

(Continued)

*Primary Examiner* — Patrick Ryan
*Assistant Examiner* — Ladan Mohaddes
(74) *Attorney, Agent, or Firm* — Fish & Richardson P.C.

(57) ABSTRACT

A microbial fuel cell for generating electricity. The microbial fuel cell includes an anode and a cathode electrically coupled to the anode. The anode is in contact with a first fluid including microorganisms capable of catalyzing the oxidation of ammonium. The anode is in contact with a second fluid including microorganisms capable of catalyzing the reduction of nitrite. The anode and the cathode may be housed in a single compartment, and the cathode may rotate with respect to the anode. The microbial fuel cell can be used to remove ammonium from wastewater, to generate electricity, or both.

18 Claims, 10 Drawing Sheets

(56) References Cited

OTHER PUBLICATIONS

GenBank Nucleotide Accession No. FJ418982, "Uncultured Firmicutes bacterium isolate DGGE gel band 13 16S ribosomal RNA gene, partial sequence," http://www.ncbi.nlm.nih.gov/nuccore/212725771, 2 pages (accessed Jul. 27, 2009).

GenBank Nucleotide Accession No. FJ418983, "Uncultured beta proteobacterium isolate DGGE gel band 14 16S ribosomal RNA gene, partial sequence," http://www.ncbi.nlm.nih.gov/nuccore/212725772, 2 pages (accessed Jul. 27, 2009).

He, Z. et al., "Electricity generation from artificial wastewater using an upflow microbial fuel cell," Environ. Sci. Technol. 39: 5262-5267 (2005).

He, Z. et al. In "Electricity Production Coupled to Ammonium in a Microbial Fuel Cell," Environ. Sci. Technol. 43: 3391-3397 (2009).

He, Z. et al., "Increased power production from a sediment microbial fuel cell with a rotating cathode," Biosensors and Bioelectronics 22: 3252-3255 (2007).

Jetten, M. S. et al., "Microbiology and application of the anaerobic ammonium oxidation ('anammox') process," Current Opinion in Biotechnology, 12: 283-288 (2001).

Jukes, T.H. et al. In "Evolution of protein molecules," Chapter 24 in *Mammalian Protein Metabolism*, H.N. Munro,Ed., Academic Press: New York, 1969; pp. 21-132.

Kan, J. et al., "Temporal variation and detection limit of an estuarine bacterioplankton community analyzed by denaturing gradient gel electrophoresis (DGGE)," Aquatic Microbial Ecology 42: 7-18 (2006).

Khan, S.T. et al., "Members of the family *Comamonadaceae* as primary poly(3-hydroxybutyrate)-degrading denitrifiers in activated sludge as revealed by a polyphasic approach," Applied Environmental Microbiology, 68: 3206-3214 (Jul. 2002).

Kim, J. R. et al., "Analysis of ammonia loss mechanisms in microbial fuel cells treating animal wastewater," Biotechnology and Bioengineering. 99: 1120-1127 (2008).

Min, B. et al., "Electricity generation from swine wastewater using microbial fuel cells," Water Research 39: 4961-4968 (2005).

Saitou, N. and M. Nei, "The Neighbor-Joining Method—a New Method for Reconstructing Phylogenetic Trees," Mol. Biol. Evol. 4: 406-425 (1987).

Schäfer, H. and G. Muyzer, "Denaturing gradient gel electrophoresis in marine microbial ecology," Chapter 22 in Methods in Microbiology, J.H. Paul, Ed.; Academic Press: London, vol. 3, Marine Microbiology, pp. 425-468 (2001).

Schmidt, I. et al., "New concepts of microbial treatment processes for the nitrogen removal in wastewater," FEMS Microbiology Reviews 27: 481-492 (2003).

Schröder, U., "Anodic electron transfer mechanisms in microbial fuel cells and their energy efficiency," Phys. Chem. Chem. Phys. 9: 2619-2629 (2007).

Sliekers, A. O. et al., "Completely autotrophic nitrogen removal over nitrite in one single reactor," Water Research 36: 2475-2482 (2002).

Strous, M. et al., "The sequencing batch reactor as a powerful tool for the study of slowly growing anaerobic ammonium-oxidizing microorganisms," Appl. Microbiol. Biotechnol. 50: 589-596 (1998).

Thamdrup et al., "Production of $N_2$ through anaerobic ammonium oxidation coupled to nitrate reduction in marine sediments," Appl. Environ. Microbiol. 68(3): 1312-1318 (2002).

Verhagen, F. J. M. and H.J. Laanbroek, "Competition for Ammonium between Nitrifying and Heterotrophic Bacteria in Dual Energy-Limited Chemostats," Appl. Environ. Microbiol. 57: 3255-3263 (Nov. 1991).

Wiesmann, U., "Biological nitrogen removal from wastewater," Advances in Biochemical Engineering Biotechnology; A. Fiechter, Ed.; Springer-Verlag: Berlin, 51: 113-153 (1994).

You, S.-J., "Identification of denitrifying bacteria diversity in an activated sludge system by using nitrite reductase genes," Biotechnology Letters 27: 1477-1482 (2005).

KIPO Commissioner, PCT Search Report and Written Opinion, Aug. 19, 2010, 10 pages.

Ringeisen et al., "A miniature micorbial fuel cell operating with an aerobic anode chamber", Journal of Power Sources 165 (2007) 591-597.

Zhen He et al., Application of Bacterial Biocathodes in Microbial Fuel Cells. Electroanalysis 18, 2006, No. 19-20, pp. 2009-2015.

PCT Search Report and Written Opinion for Application No. PCT/US2009/043848, dated Oct. 15, 2009, 12 pages.

PCT Search Report and Written Opinion for Application No. PCT/US2008/062391, dated Apr. 30, 2009, 8 pages.

Acar et al. Electrokinetic remediation: Basics and technology status. Journal of Hazardous Materials. 40(2):117-137.

Acar et al., Principles of Electrokinetic Remediation. Environmental Science and Technology. 27(13):2638-2647.

Angenent, L. T.; Karim, K.; Al-Dahhan, M.H.; Wreen, B.A.; Domiguez-Espinosa, R. Production of bioenergy and biochemicals from industrial and agricultural wastewater. Trends Biotechnol. 2004, 22, 477-485.

Arias, Y.M. and B.M. Tebo. Cr(VI) reduction by sufidogenic and nonsulfidogenic microbial consortia. Applied and Environmental Microbiology, 2003. 69(3): p. 1847-1853.

Bakermans, C., A.I. Tsapin, V. Souza-Egipsy, D.A. Gilichinsky, and K.H. Nealson. 2003. Reproduction and metabolism at −10° C. of bacteria isolated from Siberian permafrost. Environ. Microbio. 5: 321-326.

Bencheikh-Latmani, R., et al. Global Transcriptional Profiling of *Shewanella oneidensis* MR-1 during Cr(VI) and U(VI) Reduction. Appl. Environ. Microbiol., 2005. 71(11): p. 7453-7460.

Bretschger, O., et al. Current production and metal oxide reduction by *Shewanella oneidensis* MR-1 wild type and mutants. Applied and Environmental Microbiology, 2007. 73(21): p. 7003-7012.

Bretschger, O., et al. Bacterial interactions with solid substrates: Applications for microbial fuel cells, carbonate sufaces and metal oxide reduction. Geochimica Et Cosmochimica Acta, 2007. 71(15): p. A121-A121.

Bullen, R.A., et al.; "Biofuel cells and their development;" Biosensors and Bioelectronics, vol. II, Issue 11, pp. 2015-2045, May 2006.

Cao, X., et al. Electricity generation by an enriched phototrophic consortium in a microbial fuel cell. Electrochem. Commun. 2008, 10, 1392-1395.

Chain, P.; Lamerdin, J.; Larimer, F.; Regala, W.; Lao, V.; Land, M.; Hauser, L.; Hooper, A.; Klotz, M.; Norton, J.; Sayavedra-Soto, L.; Arciero, D.; Hommes, N.; Whittaker, M.; Arp, D. Complete genome sequence of the ammonia-oxidizing bacterium and obligate chemolithoautotroph *Nitrosomonas europaea*. J. Bacteriol. 2003, 185, 2759-2773.

Chen, F., et al. Application of digital image analysis and flow cytometry to enumerate marine viruses stained with SYBR gold. Appl. Environ. Microbiol. 2001, 67. 539-545.

Cheng, S., H. Liu, and B.E. Logan. Increased performance of single-chamber microbial fuel cells using an improved cathode structure. Electrochemistry Communications, 2006. 8(3): p. 489-494.

Chiao, M., et al. Micromachined microbial and photosynthetic fuel cells. J. Micromech. Microeng. 2006, 16, 2547-2553.

Cho, Y. K., et al.Development of a solar-powered microbial fuel cell. J. Appl. Microbiol. 2008, 104, 640-650.

Choi, Y., et al. Optimization of the performance of microbial fuel cells containing alkalophilic *Bacillus* sp. J. Microbiol. Biotechnol. 2001, 11, 863-869.

Chourey, K., et al. Global Molecular and Morphological Effects of 24-Hour Chromium(VI) Exposure on *Shewanella oneidensis* MR-1. Appl. Environ. Microbio., 2006. 72(9): p. 6331-6344.

Clauwaert, P., et al. Biological denitrification in microbial fuel cells. Environmental Science & Technology, 2007. 41(9): p. 3354-3360.

Davis, J.B. and H.F. Yarbrough, Jr. Preliminary Experiments on a Microbial Fuel Cell. Science, 1962. 137(3530): p. 615-616.

de Schamphelaire, L., et al. Microbial fuel cells generating electricity from rhizodeposits of rice plants.

Dollhopf, M.E., et al. Kinetics of Fe(III) and Mn(IV) reduction by the Black Sea strain of *Shewanella putrefaciens* using in situ solid state voltammetric Au/Hg electrodes. Marine Chemistry, 2000. 70(1.

International Search Report and Written Opinion dated Oct. 15, 2009 for PCT/US2009/043848, filed May 13, 2009.

Fenchel, T. Microbial behavior in a heterogeneous world. Science 2002, 296, 1068-1071.

Goel et al., "Sequential Nitrification and Denitrification in a Divided Cell Attached Growth Bioelectrochemical Reactor," Environmental Engineering Science, vol. 22, pp. 440-449 (Nov. 2005).

Gregory, K.B., D.R. Bond, and D.R. Lovley. Graphite electrodes as electron donors for anaerobic respiration. Environmental Microbiology, 2004. 6(6): p. 596-604.

Gregory, Kelvin B., et al.; "Remediation and Recovery of Uranium from Contaminated Subsurface Environments with Electrodes;" Environ. Sci. Technol. 2005, 39, pp. 8943-8947.

Ho et al. Integrated In Situ Soil Remediation Technology: The Lasagna Process. Environmental Science and Technology. 29(10):2528-2534.

He, Z., et al. An upflow microbial fuel cell with an interior cathode: Assessment of the internal resistance by impedance Spectroscopy. Environmental Science & Technology, 2006, 40(17): p. 5212-5217.

Hossain, M.A., et al. Finite element modeling of Cr(VI) redution by Shewanella oneidensis MR-1 employing the dual-enzyme kinetic model. Computers and Geosciences, 2005. 31(13): p. 1286-1292.

Hu, Q., et al. Biodiesel from algae: Lessons learned over the past 60 years and future perspectives. J. Phycol. 2006, 42, 12-12.

Inagaki, F., U. Tsunogai, M. Suzuki, A. Kosaka, H. Machiyama, K. Takai, T. Nunoura, K.H. Nealson, and K. Horikoshi. 2004. Characterization of C1-metabolizing prokaryotic communities in methane seep habitats at the Kuroshima Knoll, souther Ryukyu Arc, by analyzing pmoA, mmoX, mxaF, mcrA, and 16S rRNA genes. Appl. Environ. Microbiol. 70: 7445-7455.

Kaku, N., et al. Plant/microbe cooperation for electricity generation in a rice paddy field. Appl. Microbiol. Biotechnol. 2008, 79, 43-49.

Khan, S.T.; Horiba, Y,; Takahashi, N.; Hiraishi, A. Activity and community composition of denitrifying bacteria in poly(3-hydroxybutyrate-co-3-hydroxyvalerate)-using solid-phase denitrification processes. Microbes Environ. 2007, 22, 20-31.

Kim, H.J., et al. A mediator-less microbial fuel cell using a metal reducing bacterium, Schwanella putrefaciense. Enzyme and Microbial Technology, 2002. 30(2): p. 145-152.

Kim, B.H., et al. Enrichment of microbial community generating electricity using a fuelcell-type electrochemical cell. Applied Microbiology and Biotechnology, 2004. 63(6): p. 672-681.

Kim, J.R., et al. Power generation using different cation, anion, and ultrafiltration membranes in microbial fuel cells. Environmental Science & Technology, 2007. 41(3): p. 1004-1009.

Kindaichi, T.; Ito, T.; Okabe, S. Ecophysiological interactio between nitrifying bacteria and heterotrophic bacteria in autotrophic nitrifying biofilms as determined by microautoradiograhy.

Kornaros, M., C. Zafiri, and G. Lyberatos. Kinetics of denitrification by Pseudomonas denitrificans under grown conditions limited by carbon and/or nitrate or nitrite. Water Environment Research, 1996. 68(5): p. 934-945.

Kostka, J.E. and K.H. Nealson. Dissolution and Reduction of Magnetite by Bacteria. Environmental Science & Technology, 1995. 29(10): p. 2535-2540.

Larsen, K. S., et al. Ecosystem respiration depends strongly on photosynthesis in a temperate heath. Biogeochemistry 2007, 85, 201-213.

Liu, C.X., et al. Reduction kinetics of Fe(III), Co(III), U(VI) Cr(VI) and Tc(VII) in cultures of dissimilatory metal-reducing bacteria. Biotechnology and Bioengineering, 2002. 80(6): p. 637-349.

Liu, H.; Cheng, S.; Logan, B.E. Power generation in fed-batch microbial fuel cells as a function of ionic strength, temperature, and reactor configuration. Environ. Sci. Technol. 2005, 39, 5488-5493.

Logan,. Extracting hydrogen electricity from renewable resources. Environmental Science & Technology, 2004. 38(9): p. 160a-167a.

Logan, Bruce E., et al.; "Microbial Fuel Cells—Challenges and Applications;" Environ. Sci. Technol. 2006, 40(7) 5172-5180.

Logan et al., "Microbial Fuel Cells: Methodology and Technology," Environmental Science and Technology. 40(17):5181-5192.

Logan, B.E., et al. Electricity generation from cysteine in a microbial fuel cell. Water Res. 2005, 39, 942-952.

Lloyd, J.R. Microbial reduction of metals and radionuclides. 2003. 27(2-3): p. 411-425.

Lovley, D.R. Bug Juice: harvesting electricity with microorganisms. Nat. Rev. Microbiol. 2006, 4, 497-508.

Lovley, D.R. Dissimilatory Metal Reduction. Annual Review of Microbiology, 1993. 47: p. 263-290.

Lovley et al. Microbial reduction of uranium. Nature, 1991. 350(6317): p. 413-416.

Lowe et al. "Aerobic and Anaerobic Reduction of Cr(VI) by Shewanella oneidens Effects of Cationic Metals, Sorbing Agents and Mixed Microbial Cultures," Acta Biotechnology, vol. 23, pp. 161-178 (2003).

Marcus, A.K., C.I. Torees, and B.E. Rittmann. Conduction-based modeling of the biofilm anode of a microbial fuel cell. Biotechnology and Bioengineering, 2007. 98(6): p. 1171-1182.

Menicucci, J., et al. Procedure for determining maximum sustainable power generated by microbial fuel cells. Environmental Science & Technology, 2006. 40(3): p. 1062-1068.

Moon, H., et al. On-line monitoring of low biochemical oxygen demand through continuous operation of a mediator-less microbial fuell cell. Journal of Microbioloy and Biotechnology, 2005. 15(1): p. 192-196.

Moon, H.S., J. Komlos, and P.R. Jaffe. Uranium reoxidation in previously bioreduced sediment by dissolved oxygen and nitrate. Environmental Science & Technology, 2007. 41(13): p. 4587-4592.

Myers, C.R., et al. Chromium(VI) reductase activity is associated with the cytoplasmic membrane of anaerobically grown Shewanella putrefaciens MR-1. Journal of Applied Microbiology, 2000. 88(1): p. 98-106.

Nakajima, H., et al. Overexpression of the Roba Gene Increases Organic-Solvent Tolerance and Multiple Antibiotic and Heavy-Metal Ion Resitance in Escherichia-coli. Applied and Environmental Microbiology, 1995. 61(6): p. 2302-2307.

Nealson et al., Ecophysiology of the Genus Shewanella, in The Prokaryotes. 2006, Springer New York. p. 1133-1151.

Nealson, K.H. and W. Berelson. 2003. Layered microbial communities and the search for life in the universe. Geomicrobiol. J. 20: 451-462.

Neef, A. et al., "Monitoring a widespread bacterial group: in situ detection of planctomycetes with 16S rRNA-targeted probes," Microbiology (Reading, U.K.), 144: 3257-3266 (1998).

Ochiai, H., et al. "Living electrode" as a long-lived photoconverter for biophotolysis of water. Proc. Natl. Acad. Sci. USA 1980, 77, 2442-2444.

Oremland, R. S., et al. Anaerobic oxidation of arsenite in Mono Lake water and by facultative, arsenite-oxidizing chemoautotroph, strain MLHE-1. Appl. Environ. Microbiol. 2002, 68, 4795-4802.

Park, D.H. and J.G. Zeikus. Improved fuel cell and electrode designs for producing electricity from microbial degradation. Biotechnology and Bioengineering, 2003. 81(3): p. 348-355.

Park, H. I., et al. Bacterial communities on electron-beam Pt-deposited electrodes in a mediator-less microbial fuel cell. Environ. Sci. Technol. 2008, 42, 6243-6249.

International Search Report and Written Opinion for Application No. PCT/US2008/062391, dated Apr. 30, 2009, 12 pages.

Rabaey, K. et al.; "Microbial ecology meets electrochemistry: Electricity-driven and driving communities;" The ISME Journal, vol. 1, pp. 9-18, May 2007.

Rabaey, Korneel, et al.; "Cathodic Oxygen Reduction Catalyzed by Bacteria in Microbial Fuel Cells;" The ISME Journal, 2008, 2, pp. 519-527.

Rabaey et al., Microbial fuel cells: novel biotechnology for energy generation. TRENDS in Biotechnology, 2005, 23(6):291-298.

Rabaey, K., et al. Microbial phenazine production enhances electron transfer in biofuel cells. Environmental Science & Technology, 2005. 39(9): p. 3401-3408.

Reimers, C.E., et al. Harvesting energy from the marine sediment-water interface. Environmental Science & Technology, 2001. 35(1): p. 192-195.

Rosenbaum, M., et al. In situ electrooxidation of photobiological hydrogen in a photoioelectrochemical fuel cell based on Rhodobacter sphaeroides. Environ. Sci. Technol. 2005, 39, 6328-6333.

Rosson, R.A. and K.H. Nealson. Manganese Binding and Oxidation by Spores of a *Marine Bacillus*. Journal of Bacteriology, 1982. 151(2): p. 1027.

Rozendal, R.A., H.V.M. Hamelers, and C.J.N. Buisman. Effects of membrane cation transport on pH and microbial fuel cell performance. Environmental Science & Technology, 2006. 40(17): p. 5206-5211.

Rozendal, Rene A., et al.; "Hydrogen Production with a Microbial Biocathode;" Environ. Sci. Technol. 2008, 42, pp. 629-634.

Schmidt, I.; Bock, E. Anaerobic ammonia oxidation by cell-free extracts of *Nitrosomonas eutropha*. Antonie van Leeuwenhoek 1998, 73, 271-278.

Schmieman et al., Comparative kinetics of bacterial reduction of chromium. Journal of Environmental Engineering—Asce, 1998. 124(5): p. 449-455.

Senko, J.M., et al. The effect of U(VI) bioreduction kinetics on subsequent reoxidation of biogenic U(IV). Geochimica Et Cosmochimica Acta, 2007. 71(19): p. 4644-4654.

Shantaram, A., et al. Wireless sensors powered by microbial fuel cells. Environmental Science & Technology, 2005. 39(13): p. 5037-5042.

Stal, L. J., et al. Structure and Development of a Benthic Marine Microbial Mat. FEMS Microbiol. Ecol. 1985, 31, 111-125.

Strik, D. P. B. T. B., et al. Green electricity production with living plants and bacteria in a fuel cell. Int. J. Energy Res. 2008, 32, 870-876.

Strik, D. P. B. T. B., et al. Renewable sustainable biocatalyzed electricity production in a photosynthetic algal microbial fuel cell (PAMFC). Appl. Microbiol. Biotechnol. 2008, DOI 10.1007/s00253-008-1679-8.

Takai, K., K.H. Nealson, and K. Horikoshi. 2004. *Hydrogenomonas thermophila* gen. nov., sp. Nov., a novel thermophilic, hydrogen-oxidizing chemolithoautotroph within the Σ-Proteobacteria, isolated from a black smoker in a Central Indian Ridge hydrothermal field. Int. J. Syst. Evol. Microbio. 54: 25-32.

Tanaka, K., et al. Bioelectrochemical fuel-cells operated by the cyanobacterium, *Anabaena variabilis*. J. Chem. Tech. Biotechnol. 1985, 35B, 191-197.

Tanaka, K., et al. Effects of light on the electrical output of bioelectrochemical fuel-cells containing *Anabaena variabilis* M-2: mechanism of the post-illumination burst. J. Chem. Tech. Biotechnol. 1988, 42, 235-240.

Tebo et al., Sulfate-reducing bacterium grows with Cr(VI), U(VI), Mn(IV), and Fe(III) as electron acceptors. FEMS Microbiology Letters, 1998. 162(1): p. 193-198.

Tempest, D.W. and J.T.M. Wouters. Properties and Performance of Microorganisms in Chemostat Culture. Enzyme and Microbial Technology, 1981. 3(4): p. 283-290.

Torres, C.I., A.K. Marcus, and B.E. Rittman. Kinetics of consumption of fermentation products by anode-respiring bacteria. Applied Microbiology and Biotechnology, 2007. 77(3): 689-697.

Turick, C.E. C.E. Camp, and W.A. Apel. Reduction of $Cr(6(+))$ to $Cr(3(+))$ in a packed-bed bioreactor. Applied Biochemistry and Biotechnology, 1997. 63-5: p. 871-877.

Vainshtein et al. Model experiments on the microbial removal of chromium from contaminated groundwater. Water Research, 2003. 37(6): p. 1401-1405.

van Dongen, U., Jetten, M.S.M.; van Loosdrecht, M.C.M. The SHARON((R))-Anammox((R)) process for treatment of ammonium rich wastewater. Water Sci. Technol. 2001, 44, 153-160.

Videla, H.A. and A.J. Arvia. Response of a Bioelectrochemical Cell with *Saccharomyces-cervisiae* Metabolizing Glucose under Various Fermentation Conditions. Biotechnology and Bioengineering, 1975. 17(10): p. 1529-1543.

Virdis, B.; Rabaey, K.; Yuan, Z.; Keller, J. Microbial fuel cells for simultaneous carbon and nitrogen removal. Water Res. 2008, 42, 3013-3024.

Wang, Y.T., M.T. Suidan, and B.E. Rittmann. Modeling Biofilm Kinetics for a Low- Loaded Expanded-Bed Anaerobic Reactor. Biotechnology and Bioengineering, 1987. 30(1): p. 15-21.

Webster, I.A. The Continuously Fed Batch Reactor for Measuring Microbial-Growth Rates. Biotechnology and Bioengineering, 1983. 25(12): p. 2981-2990.

Wrighton, K. C., et al. A novel ecological role of the Firmicutes identified in a thermophilic microbial fuel cell. ISME J. 2008, doi: 10.1038/ismej.2008.48.

Xing, D. F., et al. Electricity generation by *Rhodopseudomonas palustris* DX-1. Environ. Sci. Technol. 2008, 42, 4146-4151.

Zhang, T., et al. Improved performances of *E. coli*-catalyzed microbial fuel cells with composite graphinte/PTFE anodes. Electrochemistry Communications, 2007. 9(3): p. 349-353.

Zhang, X.C. and A. Halme. Modeling of a Microbial Fuel-Cell Process. Biotechnology Letters, 1995. 17(8): p. 809-814.

(Zhen) He et al., "Application of Bacterial Biocathodes in Microbial Fuel Cells," Electroanalysis, vol. 18, pp. 2009-2015 (Jul. 2006).

* cited by examiner

ELECTRICITY GENERATION USING MICROBIAL FUEL CELLS

CROSS-REFERENCE TO RELATED APPLICATIONS

This application claims the benefit under 35 U.S.C. §119 (e)(1) of U.S. provisional application 61/052,850, filed May 13, 2008, which is incorporated by reference herein in its entirety.

STATEMENT OF GOVERNMENT INTEREST

This invention was made with government support under Contract No. FA9550-06-1-0292 awarded by Air Force Office of Scientific Research (AFOSR). The government has certain rights in the invention.

BACKGROUND

This document relates to electricity generation and fuel cells.

Inorganic pollutants in wastewater include nitrogen in various forms, such as ammonia, nitrite, and nitrate. The overload of nitrogen compounds with other nutrients discharged from wastewater, fertilizers, and other human activities, can cause eutrophication, deteriorating water quality and the aquatic ecosystem. Nitrogen-related pollutants in wastewater can be converted into dinitrogen gas through energy-consuming nitrification/denitrification and anammox (anaerobic ammonium oxidation) processes.

The oxidation of ammonium can be classified as incomplete or complete oxidation, based on the final product of the oxidation. Incomplete oxidation, with a final product other than dinitrogen gas, is the first step of nitrification through the following reaction:

$$NH_4^+ + 1.5O_2 \rightarrow NO_2^- + H_2O + 2H^+.$$

The complete oxidation process, with a final product of dinitrogen gas, is the anammox process, shown by the following reaction:

$$NH_4^+ + NO_2^- \rightarrow N_2 + 2H_2O.$$

SUMMARY

In one aspect, a microbial fuel cell includes an anode and a cathode electrically coupled to the anode. A first fluid including microorganisms capable of catalyzing the oxidation of ammonium is in contact with the anode. A second fluid including microorganisms capable of catalyzing the reduction of nitrite is in contact with the cathode.

In another aspect, treating wastewater includes providing wastewater including ammoniun to a microbial fuel cell, and oxidizing some of the ammonium to form nitrite.

In another aspect, generating electricity includes providing ammonium to a microbial fuel cell, and biocatalyzing oxidation of some of the ammonium in the microbial fuel cell.

Various implementations may include one or more of the following features. The anode and cathode can be housed in a single compartment. The first fluid and the second fluid can be the same. In some cases, the anode and the cathode are not separated by a membrane. In some cases, the anode and the cathode are separated by an anion exchange membrane.

The microorganisms in the microbial fuel cell capable of catalyzing the reduction of nitrite can also be capable of catalyzing the reduction of nitrate. The microorganisms capable of catalyzing the oxidation of ammonium can also be capable of catalyzing the reduction of nitrite. The microorganisms capable of catalyzing the oxidation of ammonium may be present in the form of a biofilm on the cathode. In some cases, the microorganisms capable of catalyzing the oxidation of ammonium are anaerobic. In certain cases, the microorganisms capable of catalyzing the oxidation of ammonium are capable of catalyzing the complete oxidation of ammonium to dinitrogen gas. Some of the ammonium can be oxidized to form nitrite. Some of the nitrite can be reduced to form dinitrogen gas.

In some implementations, the cathode is configured to rotate with respect to the anode. The cathode may include a multiplicity of cathode elements connected in series. In some cases, the microbial fuel cell is operable a sequencing batch reactor. The microbial fuel cell can be operable to generate electricity.

Some implementations include providing nitrite to the microbial fuel cell. Providing nitrite to the microbial fuel cell can include providing wastewater to the microbial fuel cell. Providing ammonium to the microbial fuel cell can also include providing wastewater to the microbial fuel cell.

DETAILED DESCRIPTION

This document describes examples of techniques, apparatuses, and systems for generating electricity with microbial fuel cells (MFCs). As described herein, nitrogen-related pollutants, such as ammonium, can be used to produce electricity in MFCs through complete or incomplete oxidation processes. In some implementations of incomplete oxidation of ammonium, ammonium is oxidized to form nitrite ($E_0$=+0.47 V at 25° C.). In some implementations of complete oxidation of ammonium, ammonium is oxidized and nitrite is reduced to form dinitrogen gas ($E_0$=+1.23 V at 25° C.). Microorganisms that facilitate electricity generation include anaerobic ammonia-oxidizing bacteria and nitrate/nitrite reducing bacteria.

Electricity generation from ammonium oxidation may be achieved with a MFC (e.g., a one-compartment MFC or a two-compartment MFC). In a two-compartment MFC, oxidation of ammonium (electron donor) in an anammox-like process occurs under a first set of conditions in the anode compartment of the MFC, and reduction of nitrite (electron acceptor) occurs under a second set of conditions in the cathode compartment of the MFC to form dinitrogen gas. The anode compartment and the cathode compartment are separated by a membrane such as, for example, an ion exchange membrane. The reactions can be catalyzed by the same or different microorganisms (e.g., anaerobic ammonia-oxidizing bacteria in the anode compartment and nitrate/nitrite reducing bacteria in the cathode compartment).

Figure 1:
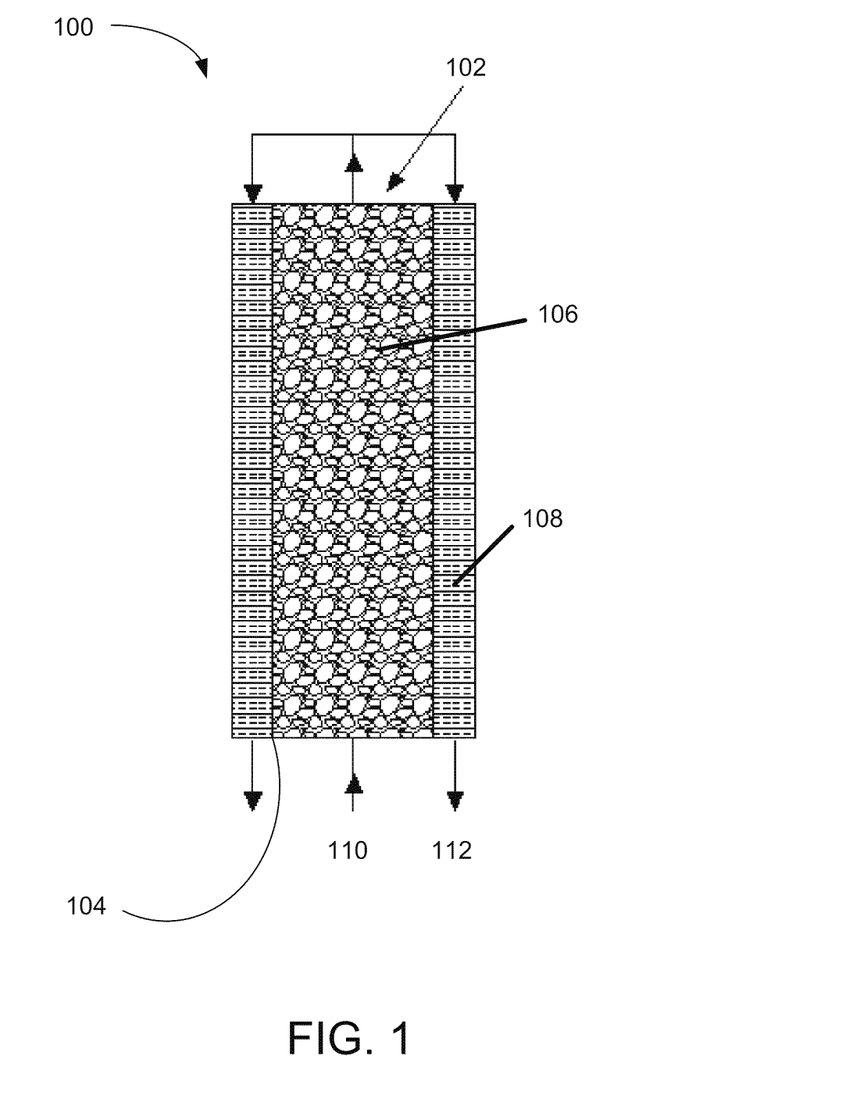
FIG. 1 illustrates a two-compartment microbial fuel cell.

FIG. 1 illustrates a two-compartment MFC 100. MFC 100 includes a closed anode chamber 102. The anode chamber 102 is sealed by an anion exchange membrane 104 (Ultrax, Membrane International Inc., N.J.) and filled with granular graphite 106. The anion exchange membrane 104 promotes anaerobic conditions at the anode and, unlike a cation exchange membrane, inhibits loss of ammonium via diffusion through the membrane. The cathode electrode 108 may be made, for example, from a layer of carbon cloth wrapped outside the anode chamber 102. The influent 110, which includes ammonium (e.g., aqueous ammonia) and may be wastewater, for example, is fed into the bottom of the MFC. The anode effluent 112 is distributed to flow through the cathode 108, forming a complete loop. Ammonium may be partially oxidized under anaerobic conditions in the anode chamber 102, thereby supplying electrons to the anode electrode. The remaining ammonium may be aerobically oxidized on the cathode electrode 108 with the products of nitrite/nitrate that later function as electron acceptors in cathode reactions. When the anode effluent 112 has a relatively low pH, flow of the effluent through the cathode electrode 108 may buffer the pH of the catholyte and reduce the adverse effect of increasing pH on electricity generation.

In a one-compartment MFC, the oxidation and reduction reactions occur in a single compartment that houses the anode and the cathode. Complete oxidation of ammonium and reduction of nitrite are accomplished by the same or different microorganisms under the same conditions in, for example, an anammox process. An example of a one-compartment MFC is the rotating-cathode MFC described by He et al. in "Increased power production from a sediment microbial fuel cell with a rotating cathode," *Biosens. Bioelectron.* 2007, 22, 3252-3255, which is incorporated by reference herein.

Figure 2:
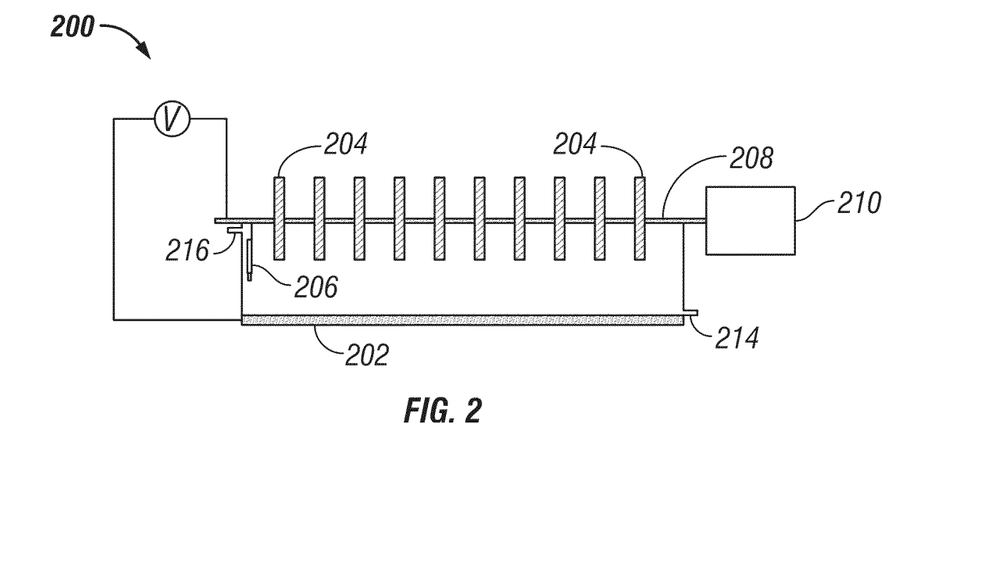
FIG. 2 is a schematic view of a rotating-cathode microbial fuel cell.

FIG. 2 shows a schematic view of a rotating-cathode MFC 200, with anode electrode 202, cathode electrodes 204, and reference electrode 206. The cathode electrodes 204, which can be shaped as discs, are connected in series by a conductive rod 208 attached to a drive 210. Drive 210 is operable to rotate the rod 208, thereby rotating the cathode electrodes 204. The cathode electrodes 204 are positioned above the anode electrode 202 so that a portion (e.g., 10-60%) of one or more of the cathode electrodes is immersed in fluid. In some implementations, there is no membrane between the anode and the cathode. Influent enters MFC 200 through opening 214, and effluent leaves the MFC through opening 216.

Figure 3:
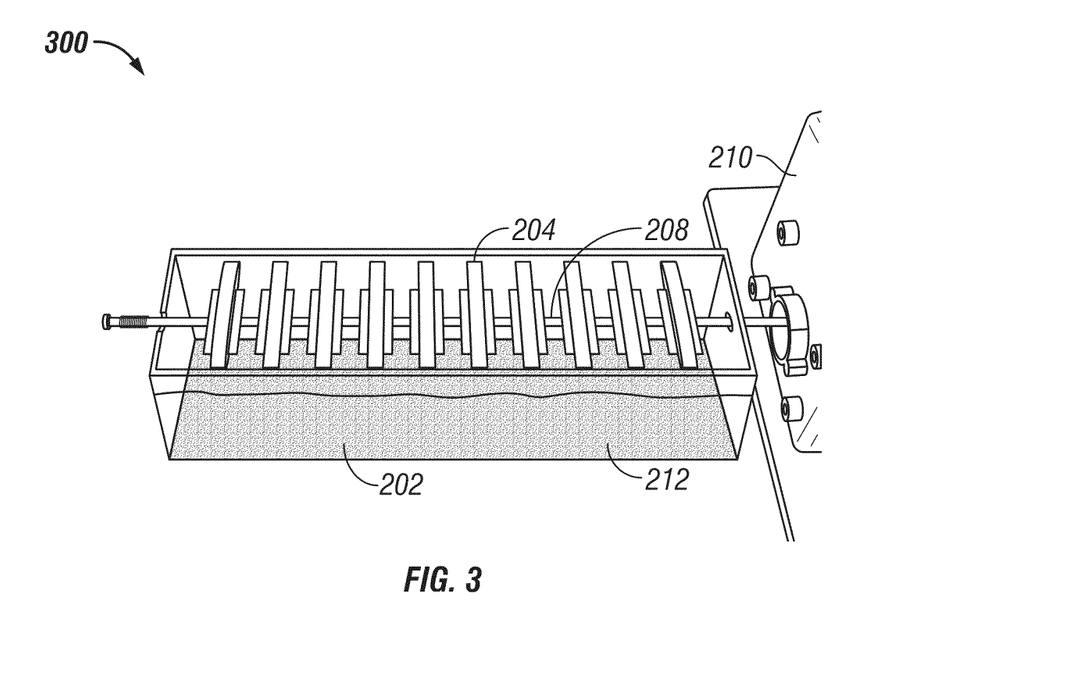
FIG. 3 is another view of a rotating-cathode microbial fuel cell.

FIG. 3 is an example of a one-compartment rotating-cathode MFC 300. As shown in FIG. 3, the anode electrode 202 is a piece of graphite plate (6×25 cm$^2$) (POCO Graphite Inc., Decatur, Tex.), placed on the bottom of a rectangular plastic chamber (25[L]×7.5[H]×6[W] cm$^3$ with a liquid load of ~650 mL). The cathode electrode 204 includes 10 pieces of round-shape graphite felt (Electrolytica Inc., Amherst, N.Y.) with a diameter of 5.5 cm. The graphite felt is connected in series by a graphite rod 208 (POCO Graphite Inc.) attached to a pump drive 210 (Cole-Parmer Instrument Company, Vernon Hill, Ill.). The cathode electrodes 204 are installed above the anode electrode 202 so that about 40% of the graphite felt is immersed in solution 212. The distance between the bottom of the graphite felt 204 and the top of the anode electrode 202 is about 2.5 cm. A 1000Ω resistor is connected between the anode and cathode electrodes using copper wire. Influent enters MFC 300 through a first opening, and effluent leaves the MFC through second opening.

In an example, MFC 300 was operated at a room temperature (23-25° C.) as a sequencing batch reactor (SBR). As described by Strous et al., in "The sequencing batch reactor as a powerful tool for the study of slowly growing anaerobic ammonium-oxidizing microorganisms," *Appl. Microbiol. Biotechnol.* 1998, 50, 589-596, which is incorporated by reference herein, SBR has been shown to cultivate slowly growing anaerobic ammonium-oxidizing bacteria. A mixture of aerobic and anaerobic sludge (mixing ratio 1:1) from a local wastewater treatment plant was used to inoculate the MFC. One liter of the basic feed solution (without ammonium) was pumped through the MFC in a period of 1 hour every day to promote a maximum removal of the residues from the previous day. Thus, the hydraulic retention time (HRT) was 1 day.

As described by He et al. in "Electricity generation from artificial wastewater using an upflow microbial fuel cell," *Environ. Sci. Technol.* 2005, 39, 5262-5267, which is incorporated by reference herein, the basic feed solution contained 1.5 g $NaHCO_3$, 0.002 g $MgSO_4$, 0.015 g $CaCl_2$, 0.005 g $KH_2PO_4$, 0.01 g $K_2HPO_4$, and 1 mL of trace elements per liter of tap water. Ammonium chloride (or other ammonium compound) was added into multiple locations of the MFC (e.g., using a spoon) immediately after the basic solution feeding was stopped. The crystalline chemicals precipitated on the bottom (the top of anode electrode) of the MFC, dissolved, and were distributed later by the agitation of the cathode electrode rotation at a speed of about 1.1 rpm.

The cell voltage was recorded every 30 seconds by a digital multimeter (2700, Keithley Instruments, Cleveland, Ohio), as described by He et al. in "Electricity Production Coupled to Ammonium in a Microbial Fuel Cell," *Environ. Sci. Technol.* 2009, 43, 3391-3397, which is incorporated by reference herein. The concentration of ammonium nitrogen was determined using an ammonium ion electrode according to the procedure provided by the manufacturer (Cole-Parmer Instrument Company, Vernon Hills, Ill.). Nitrite and nitrate were measured spectrophotometrically, as described by Doane et al. in "Spectrophotometric determination of nitrate with a single reagent," *Anal. Lett.* 2003, 36, 2713-2722, which is incorporated by reference herein. The pH was measured using a Benchtop pH meter (UB-10, Denver Instrument, Denver, Colo.). Coulombic efficiency was calculated by dividing coulomb output (integrating current and time) by total coulomb input (based on inorganic ammonium) as described by He et al. in "Electricity generation from artificial wastewater using an upflow microbial fuel cell," *Environ. Sci. Technol.* 2005, 39, 5262-5267.

A slice of cathode electrode, 0.3 g of sediment (anode), and original inoculum (0.3 g of mixed sludge) were collected and genomic DNA was extracted by UltraCLean Soil DNA kit (MO BIO Laboratories, Carlsbad, Calif.) following the manufacturer's instructions. DNA concentration was estimated on the basis of 260 nm absorbance using a Spectrophotometer ND-1000 (NanoDrop Products, Wilmington, Del.).

PCR amplification was performed in a 50 μL reaction containing approximately 25 ng of template DNA, 25 μL of PCR Mastennix (Qiagen), 0.5 mM (each) primer, and double distilled water. The PCR program was performed with a Mastercycler gradient (Eppendorf, Hamburg, Germany). PCR primers used were 341f (GC) and 907r. The PCR program followed the protocol described by Scafer et al. in "Denaturing gradient gel electrophoresis in marine microbial ecology," in Methods in Microbiology; Paul, J., ed.; Academic Press: London, 2001; pp. 425-468. Agarose gel electrophoresis was used to detect and estimate the concentrations of PCR amplicons. Denaturing gradient gel electrophoresis (DGGE) was performed as described by Kan et al. in "Temporal variation and detection limit of an estuarine bacterioplankton community analyzed by denaturing gradient gel electrophoresis (DGGE)," Aquat. Microb. Ecol. 2006, 42, 7-18, which is incorporated herein by reference, except the linear gradient of the denaturants was from 40-70% instead of 40-65%.

Anammox bacteria are members of the Planktomycetes phylum. To detect anammox bacteria on both the anode and the cathode electrodes, a sequential PCR approach was employed. First, Plancotomycetales-specific 16S fRNA gene was amplified by using the Pla46 primer and universal primer, as described by Neef et al. in "Monitoring a widespread bacterial group: in situ detection of planctomycetes with 16S rRNA-targeted probes," Microbiology (Reading, U.K.), 1998, 144, 3257-3266 and Ferris et al., "Denaturing gradient gel electrophoresis profiles of 16S rRNA-defined populations inhabiting a hot spring microbial mat community," Appl. Environ. Microbiol. 1996, 62, 340-346. Following this, amplification of the 16S rRNA gene for DGGE was performed using universal bacteria-specific primers 1070f and BC clamp primer 1392r.

Representative bands were excised from DGGE gels and incubated in diffusion buffer (0.25 M ammonium acetate, 10 mM magnesium chloride, and 0.1% SDS at 50° C. for 30 min. One microliter of supernatant was used to reamplify the band. PCR products were purified by ExoSAP-IT (USB, Cleveland, Ohio) and sequenced with primer 341f (no GC) by using Bigdye-terminator chemistry by ABI PRISM3100 Genetic Analyzer (Applied Biosystems, Foster City, Calif.). All sequences were compared with GenBank database using BLAST, and the closest matched sequences were obtained and included in the downstream analysis. Phylogenetic trees were constructed using MacVector 10.0 software package (MacVector, Inc., Cary, N.C.). Sequence alignment was performed with the program CLUSTALW. Evolutionary distances were calculated using the Jukes-Cantor method and distance trees were constructed using the neighbor-joining algorithm, as described by Jukes et al. in "Evolution of protein molecules," in Mammalian Protein Metabolism; Munro, H. N., Ed., Academic Press: New York, 1969; pp. 21-132 and Saitou et al. in "The Neighbor-Joining Method—a New Method for Reconstructing Phylogenetic Trees," Mol. Biol. Evol. 1987, 4, 406-425, respectively. Bootstrap values were obtained on the basis of the analysis of 1000 resampling data sets. Sequences of the partial 16S rRNA genes of representative DGGE bands have been deposited in the GenBank database under accession numbers FJ418973-FJ418983.

Figure 4A:
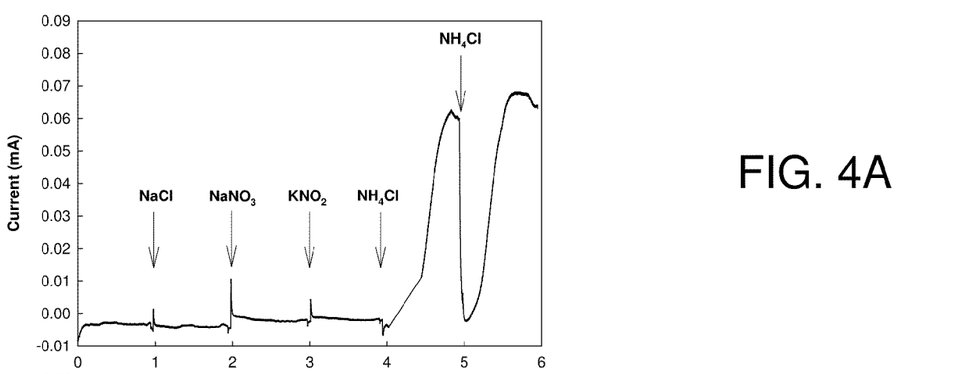
FIGS. 4A-4C show plots indicating electricity generation from ammonium.
Figure 4B:
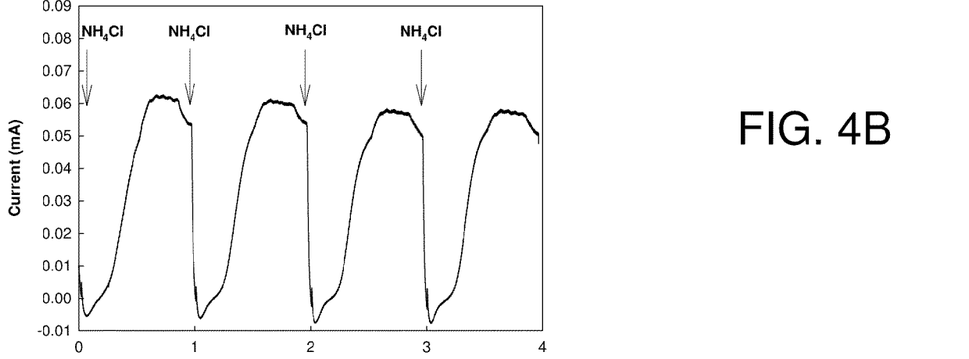
Figure 4C:
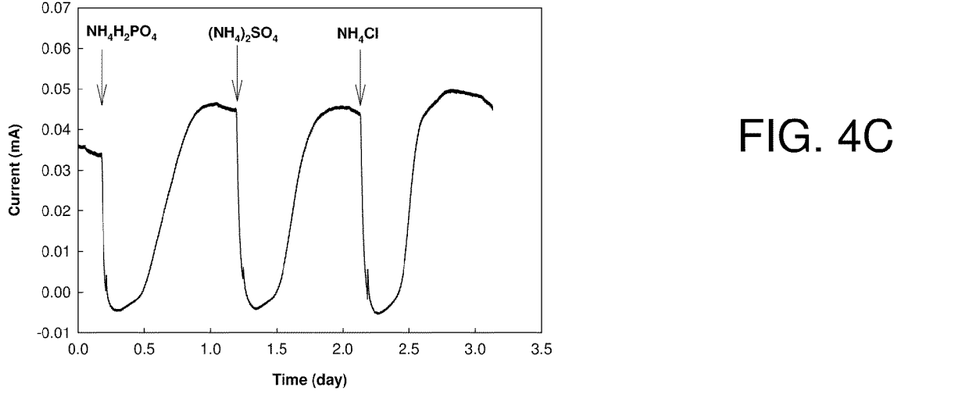

Production of electric current was observed after 2 months' operation. FIGS. 4A-4C show electricity generation from ammonium as an anodic fuel. Arrows indicate the replenishment of the basic feed solution and addition of chemicals.

FIG. 4A shows the addition of various substances to a microbial fuel cell. To exclude the possibility that increasing ionic strength results in current increase, 1 g of sodium chloride (NaCl) was added as indicated and no current increase was observed. The addition of nitrate or nitrite in the absence of ammonium had no noticeable effect on current production. As shown in FIG. 4A, the addition of 1 g of sodium nitrate ($NaNO_3$) and 1 g of potassium nitrite ($KNO_3$), as indicated, did not produce any current. When 1 g of ammonium chloride ($NH_4Cl$) was added as indicated, the current gradually increased from 0 to about 0.062 mA in about 12 hours. The second addition of 1 g of ammonium chloride ($NH_4Cl$) generated 0.068 mA. The rapid drop in current production occurred as the fresh nutrient solution was flushed through the MFC.

FIG. 4B shows repeated addition of 1 g of ammonium chloride ($NH_4Cl$) as indicated. The MFC produced a current ranging from about 0.057 to about 0.062 mA. Addition of other ammonia-related compounds, including 2.2 g ammonium phosphate (monobasic) ($NH_4H_2PO_4$) and 1.2 g ammonium sulfate (($NH_4)_2SO_4$), were also added as indicated in FIG. 4C. Both compounds produced a current of about 0.046 mA when the amounts containing same nitrogen content as 1 g of ammonium chloride were added.

Figure 5A:
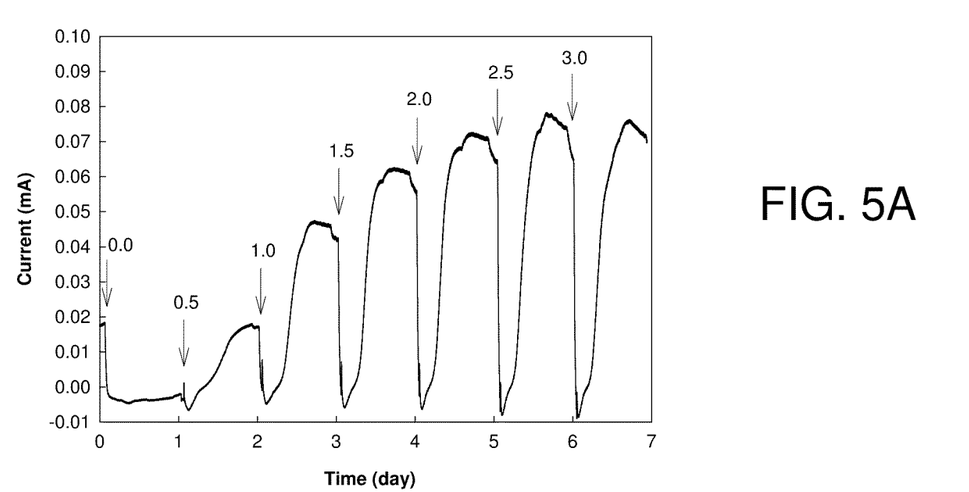
FIGS. 5A-5B show effects of ammonium dosage on current generation.
Figure 5B:
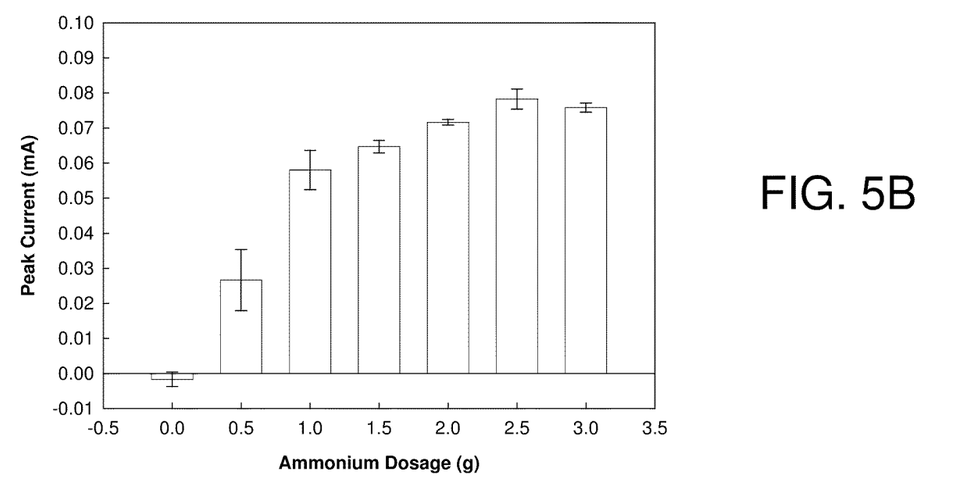

FIG. 5A depicts current vs. time for a series of additions with different amounts of ammonium chloride. Arrows indicate the replenishment of the basic feed solution and addition of ammonium chloride. Current production increased with an increasing ammonium dosage from 0.5 g, 1.0 g, 1.5 g, 2.0 g, 2.5 g, and 3.0 g, as indicated. Current production was shown to be dependent on the concentration of ammonium up to 3.0 g (74.7 mM). The highest peak current of 0.078±0.003 mA occurred following an addition of 62.3 mM $NH_4Cl$. FIG. 5B shows the mean values of peak current at different ammonium dosage. Error bars represent standard deviation based on triplicate measurements from a single reactor. In the absence of ammonium, the current was 0.001±0.002 mA. The current increased to 0.027±0.008 mA following the addition of 0.5 g of ammonium chloride. The current increased to 0.078±0.003 mA following the addition of 2.5 g of ammonium chloride. The current was 0.076±0.001 mA following the addition of 3.0 g of ammonium chloride.

FIGS. 4A-4C and 5A-5B indicate that electric current production is coupled to ammonium addition, and that ammonium functions as a substrate (i.e., an anodic fuel) for electricity generation.

Figure 6A:
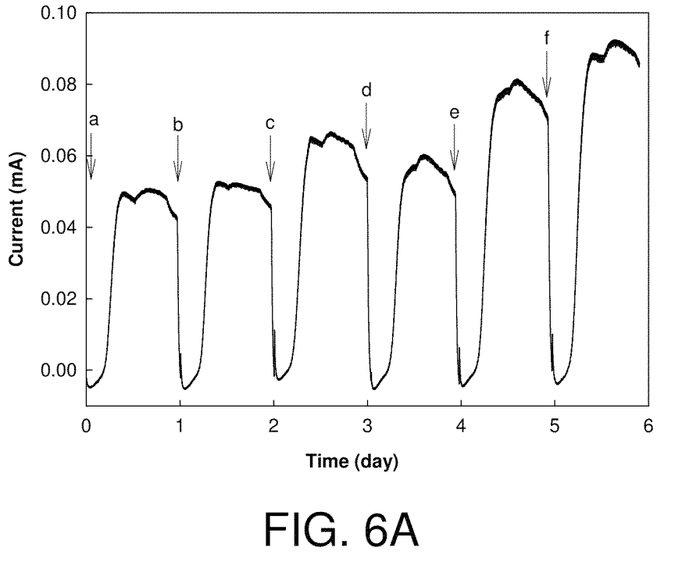
FIGS. 6A-6B show current production and peak current from the addition of nitrate or nitrite with ammonium.
Figure 6B:
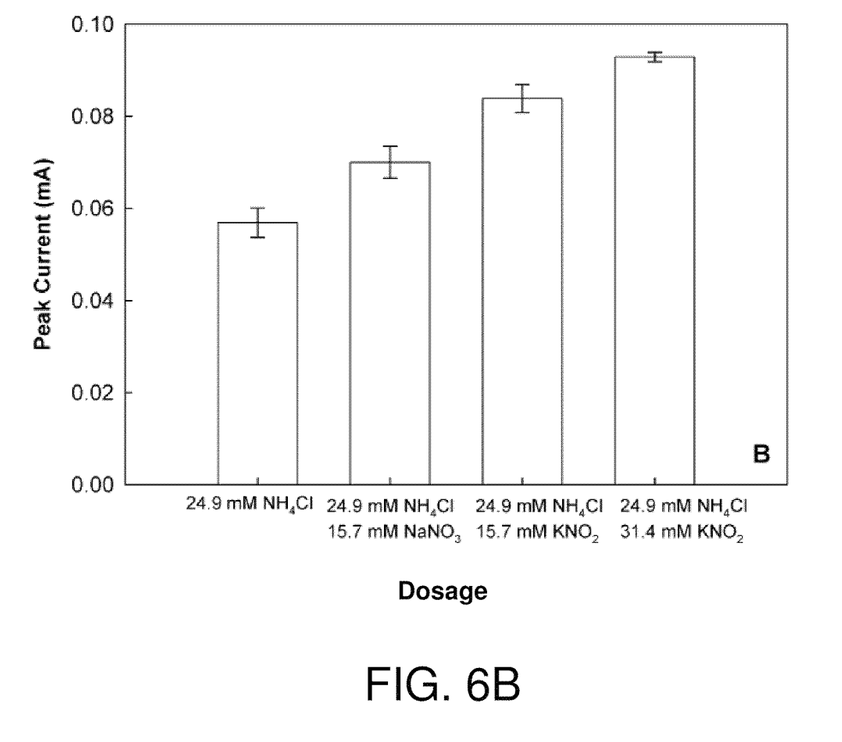

FIGS. 6A-6B show generation of electric current via an anammox-like process in which nitrate or nitrite was added with ammonium into a MFC. In FIG. 6A, arrows indicate the replenishment of the basic feed solution and addition of chemicals. The test started with adding 1 g of $NH_4Cl$ (a and b) to obtain a background current profile. Compared with $NH_4Cl$ addition alone, the peak current increased to 0.066 mA following the addition of 1 g of $NaNO_3$ and 1 g of $NH_4Cl$ (c). Then, 1 g of $NH_4Cl$ was dosed again (d) while flushing out the remaining nitrate from the previous addition. The peak current following the addition of 1 g of $KNO_2$ with 1 g of $NH_4Cl$ (e) was 0.081 mA, which further increased to 0.092 mA following the addition of 2 g of $KNO_2$ and 1 g of $NH_4Cl$ (f). Replicate tests confirmed the enhancement of current production with the addition of either nitrate or nitrite with ammonium. FIG. 6B shows mean values of peak currents based on triplicate measurements from a single reactor for the indicated dosage. Error bars represent standard deviation based on triplicate measurements from a single reactor.

FIGS. 6A-6B indicate that both nitrate and nitrite stimulate current production, and, at least in a given range, a higher amount of nitrite resulted in a higher current generation. This suggests that nitrate/nitrite act as electron acceptors in electricity generation from ammonium in the MFC. That nitrate addition resulted in less current increase than nitrite (containing the same nitrogen equivalent) may indicate that nitrite is a better electron acceptor than nitrate. Accordingly, the current production via nitrate and ammonium may be a function of nitrate reduction (nitrite production), which may not be as efficient as direct nitrite addition. It follows in theory that nitrite, the product of nitrate reduction, is the oxidant for ammonium in an anammox-like process that generates electricity via ammonium oxidation and nitrite reduction.

Figure 7:
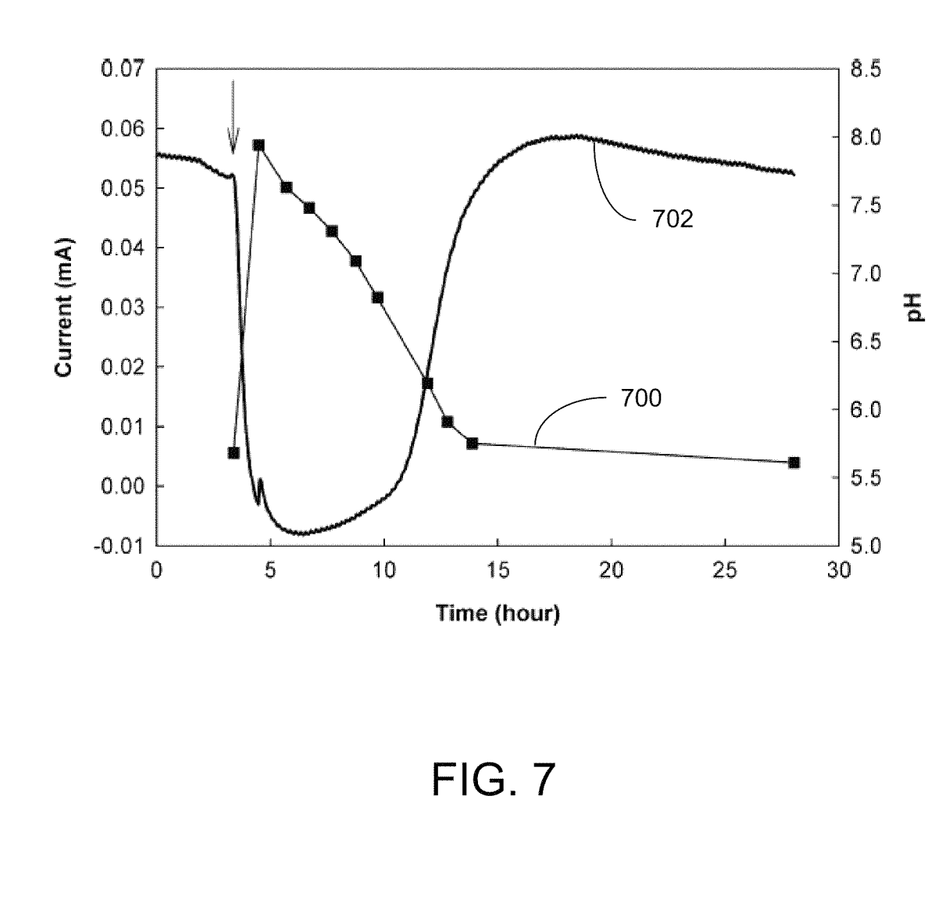
FIG. 7 illustrates current production and pH change following replenishment of feed solution and addition of ammonium chloride.

Ammonium concentration was monitored after the addition of 24.9 mM of $NH_4Cl$. At a HRT of 1 day, 49.2±5.9% of ammonium was removed after one day's operation. The main product was nitrite, which accounted for 69.3±9.9% of ammonium removal; nitrate production accounted for 14.4±19.9% of ammonium removal. In an open-system MFC, as shown in FIG. 3, ammonia volatilization may play a role in ammonium removal. Low electrolyte pH may not be favorable for the formation of ammonia gas, as shown in FIG. 7, in which current production (plot 700) and pH (plot 702) are shown as a function of time. The arrow indicates the replenishment of the basic feed solution and addition of 24.9 mM of $NH_4Cl$. At 25° C., about 4-9% aqueous ammonium was in the-form of $NH_3$ at the pH of the fresh nutrient solution (7.97±0.18), whereas the pH rapidly dropped, and after one day's operation almost no $NH_3$ was present at the pH of 5.72±0.07. The Coulombic efficiency (CE) calculated for a single addition of $NH_4Cl$ and a HRT of 1 day was 0.06±0.00%. When the HRT was extended to 6 days, the ammonium removal was 69.7±3.6% and the CE was increased to 0.34±0.02%.

Figure 8A:
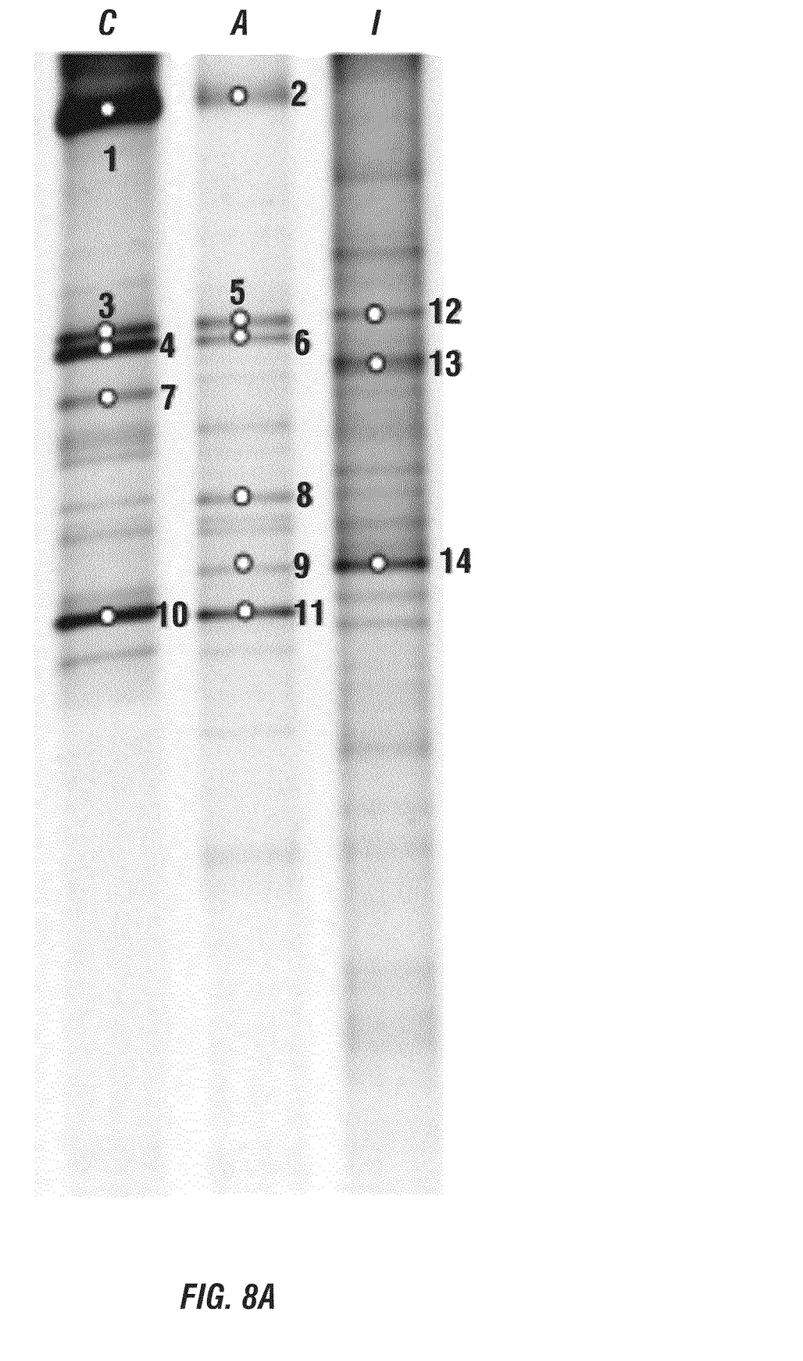
FIG. 8A is a denaturing gradient gel electrophoresis image of bacteria on a cathode, an anode, and the original inoculum of a microbial fuel cell.
Figure 8B:
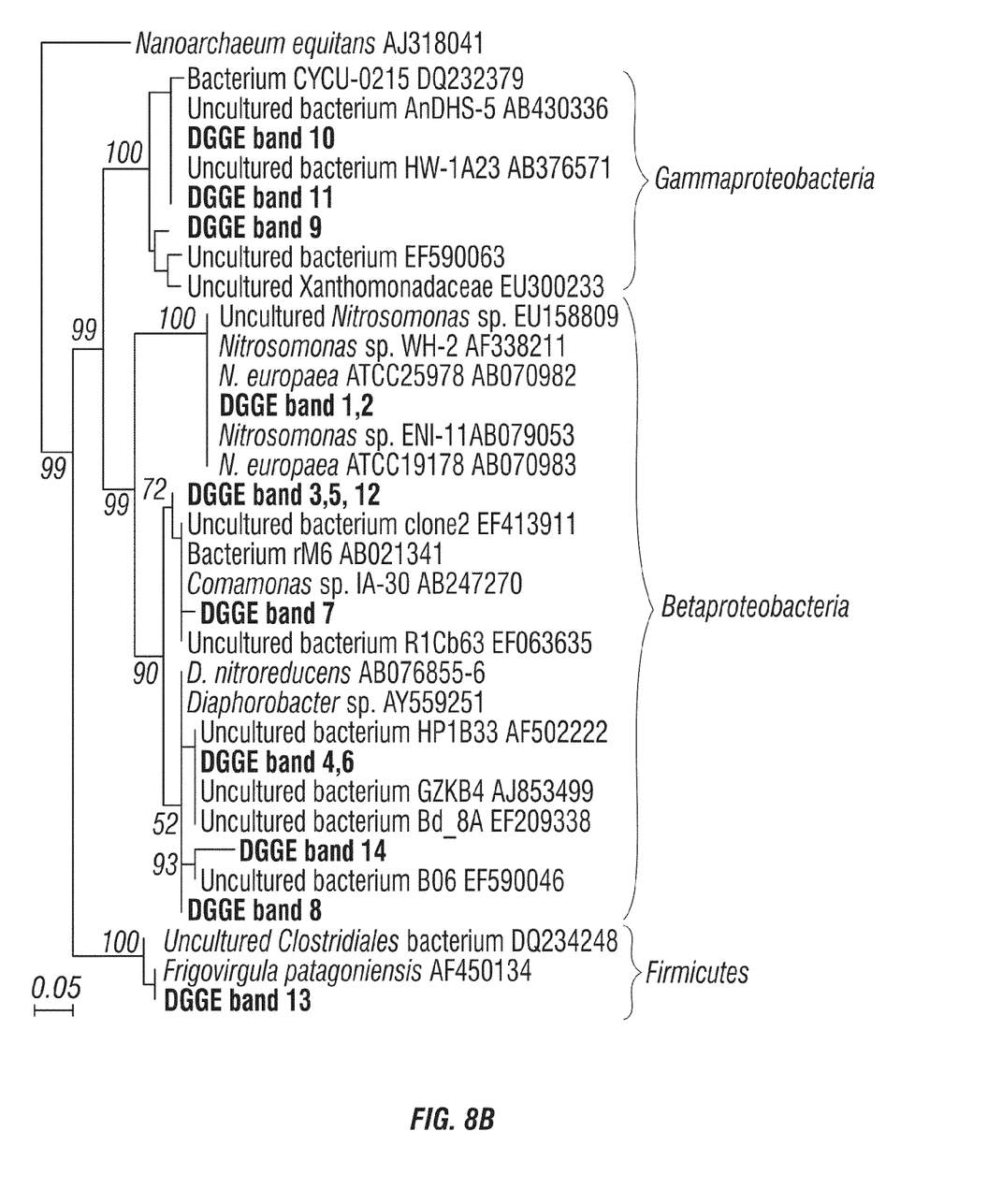
FIG. 8B is a phylogenetic construction of denaturing gradient gel electrophoresis band sequences.

The molecular (DGGE) analysis revealed that the bacteria on the electrodes were different from the bacterial composition of the original inoculum, whereas similar DGGE band patterns were observed from the anode and cathode microbes. This can be seen in FIG. 8A, which shows a DGGE gel image of bacteria on the cathode (C), the anode (A), and the original inoculum (I), and FIG. 8B, which shows phylogenetic construction of DGGE band sequences. The original inoculum mainly contained Betaproteobacteria (bands 12 and 14) and Firmicutes (band 13). However, ammonium-oxidixing and denitrifying bacterial were more prevalent in both anode and cathode bacterial assemblages. For instance, DGGE bands 1 and 2 were affiliated with the ammonium-oxidizing Betaproteobacteria, *Nitrosomonas europaea*, whereas bands 3, 5, and 7 were closely related to the autotrophic denitrifying bacteria *Comamonas* sp. IA-30. Bands 4 and 6 showed high similarity with the denitrifying bacteria isolated from activated sludge (*Diaphorobacter nitroreducens*), and bands 10 and 11 were similar to a denitrifying Gammproteobacterium, Bacterium CYCU-0215. No evidence of the presence of anammox bacteria was seen at either the anode or the cathode.

Figure 9A:
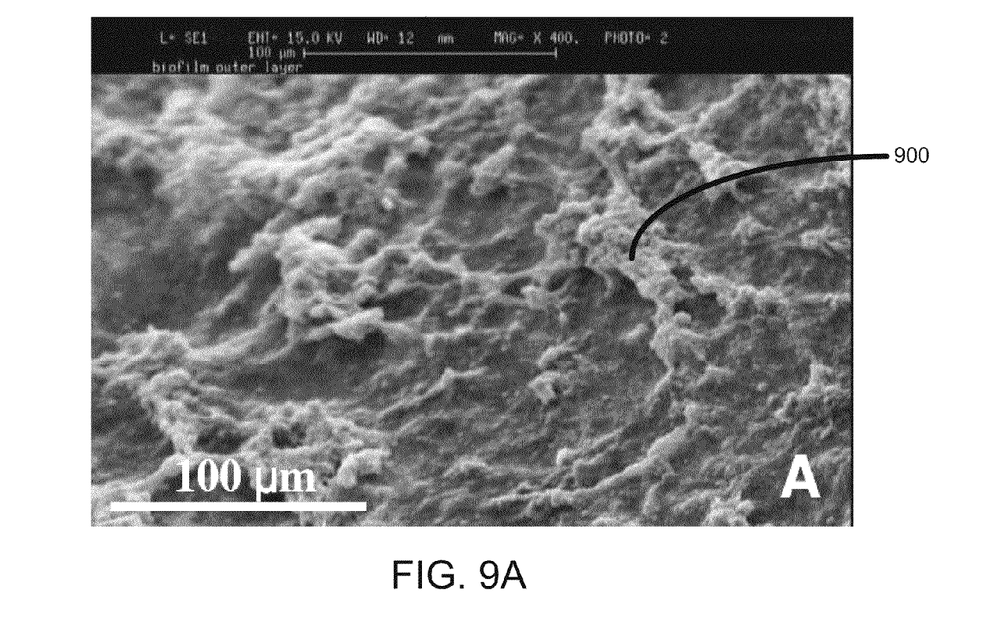
FIGS. 9A-9C show scanning electron micrographs of the cathode electrode in a microbial fuel cell.
Figure 9B:
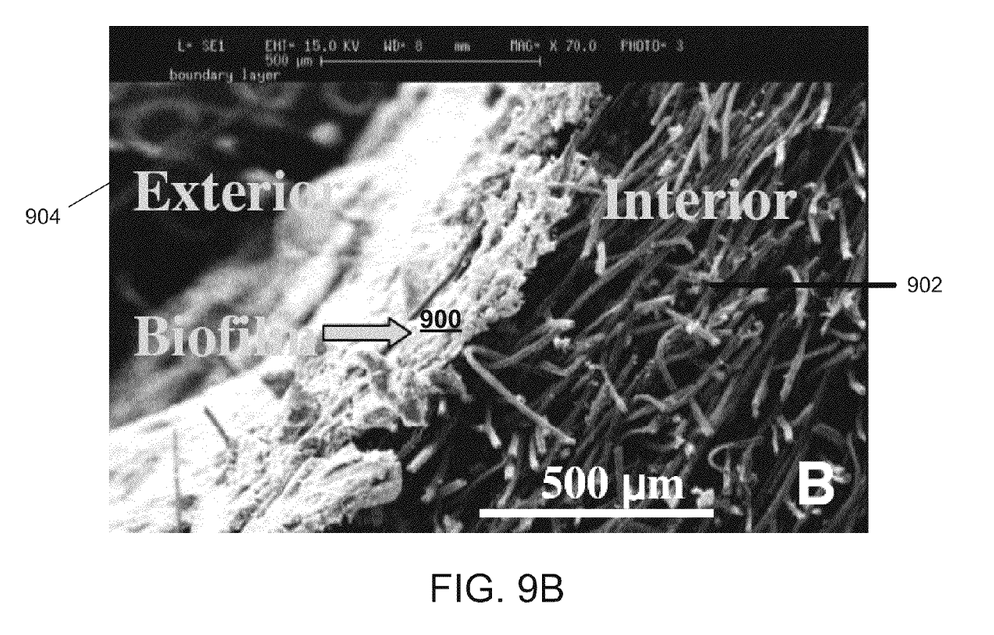
Figure 9C:
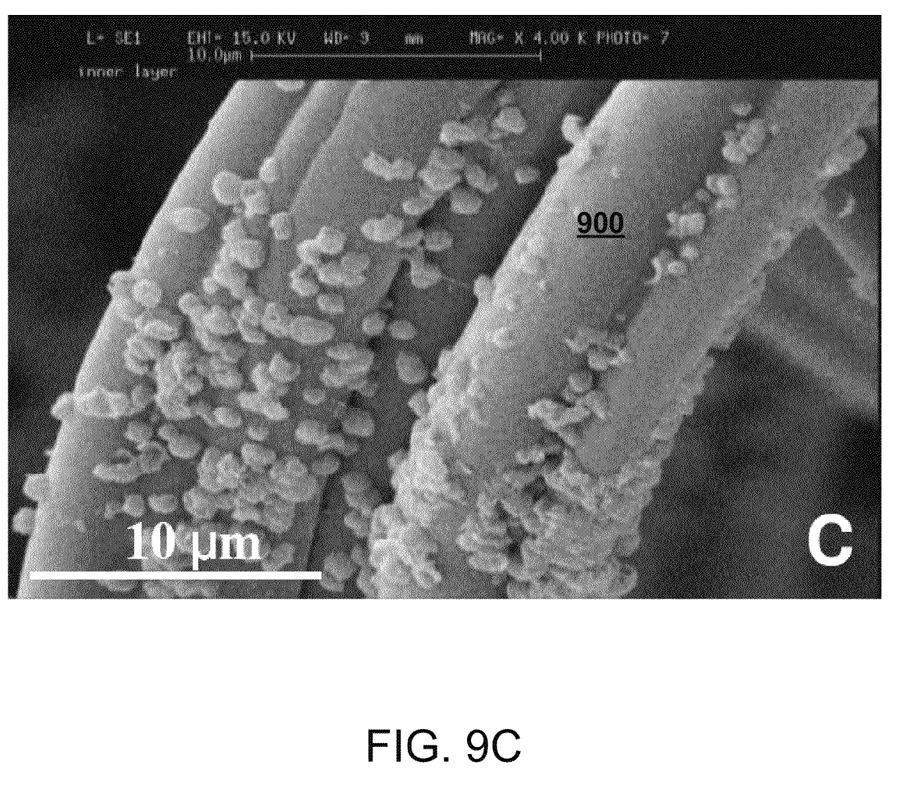

FIGS. 9A-9C show scanning electron micrographs (SEMs) of a cathode electrode of a MFC. FIG. 9A shows a biofilm 900 formed on the surface of a cathode electrode. The biofilm includes microorganisms capable of oxidizing ammonium. Ammonium added into the reaction is aerobically oxidized to nitrite by the microorganisms in the biofilm. The biofilm layer inhibits oxygen intrusion into the inner part of the cathode electrode, and is substantially anoxic or anaerobic inside. FIG. 9B shows a cross-sectional view of the cathode electrode, with interior 902 and exterior 904, and biofilm 900 on the surface. A small amount of anaerobic bacteria (possibly nitrite-reducing bacteria) attached on the graphite fibers reduce nitrite into dinitrogen gas by accepting electrons from the cathode electrode. FIG. 9C shows a SEM of graphite fibers 906 inside the cathode electrode.

The experimental results indicate that electric current production is coupled to ammonium addition, and that ammonium can function as the substrate either directly or indirectly for electricity generation. Given that no current was produced for the first two months, abiotic ammonium oxidation and current production do not appear to be occurring—the current production appears instead to be related to the enrichment of an ammonium oxidizing community capable of generating electric current and removing ammonium. In the absence of nitrite, oxygen can promote conversion of some ammonium (partial oxidation) into nitrite. Thus, a complete anaerobic condition may not promote microorganism cultivation unless nitrite is externally added.

Nitrate and/or nitrite play a role in electricity generation, possibley as electron acceptors, indicated by the increase of current generation when adding nitrate or nitrite with ammonium. The increased ionic strength due to the addition of nitrate or nitrite may also contribute to current increase. However, when the same amount of nitrate or nitrite was added with ammonium, the added nitrite resulted in 19.7% higher current generation than nitrate, indicating that nitrite or nitrate functioned more than increasing ionic concentration. It is believed that both nitrate and nitrite can function as electron acceptors in the cathode of MFCs.

DGGE analyses suggested that diverse denitrifying bacteria were enriched on both electrodes. Among them, bands 10 and 11 were similar to Gammaproteobacterium CYCU-0215, which was isolated from an activated sludge system and identified as a major denitrifying bacteria reducing nitrate, as described by You in "Identification of denitrifying bacteria diversity in an activated sludge system by using nitrite reductase genes," *Biotechnol. Lett.* 2005, 27, 1477-1482, which is incorporated by reference herein. In addition, *Comamonas* sp. and *D. nitroreducens* (bands 3-7) belong to the family Comamonadaceae, Betaproteobacteria, and have been found in denitrifying bacterial communities, as described by Khan et al. in "Members of the family Comamonadaceae as primary poly(3-hydroxybutyrate)-degrading denitrifiers in activated sludge as revealed by a polyphasic approach," *Appl. Environ. Microbiol.* 2002, 68, 3206-3214, which is incorporated by reference herein.

Based on the results described herein, the denitrifying bacteria may work together with ammonium-oxidizing bacteria to facilitate electron transport from ammonium to nitrate, and thus generate electric current. That nitrate addition caused less current increase than nitrite (containing the same nitrogen equivalent) may be because nitrite, instead of nitrate, is the terminal electron acceptor. Therefore, the current production via nitrate and ammonium may depend on nitrate reduction (nitrite production). This is in accordance with the finding that during ammonium oxidation with nitrate, it is believed that nitrite, the product of nitrate reduction, is the oxidant for ammonia, as described by Thamdrup et al in "Production of N-2 through anaerobic ammonium oxidation coupled to nitrate reduction in marine sediments," *Appl. Environ. Microbiol.* 2002, 68, 1312-1318, which is incorporated herein by reference.

On the basis of these findings, an aerobic/anaerobic ammonium oxidation process is proposed to illustrate electron transfer in this rotating cathode MFC. Because of the presence of oxygen (both the anode and cathode potentials were above 0 V vs Ag/AgCl, indicating the oxygen intrusion into the system) and the availability of ammonium to both the anode and the cathode electrodes, aerobic ammonium oxidation is expected to be a dominant process. This is consistent with the result that the ammonium-oxidizing bacterium, *Nitrosomonas europaea*, was found dominant on both the anode and cathode electrodes. *N. europaea* is known to derive energy for growth from the oxidation of ammonium by the successive function of ammonium monooxygenase (AMO) and dihydroxylamine oxidoreductase (HAO). It is also known that *N. europaea* is able to anaerobically oxidize ammonium using nitrite as the oxidant.

It is proposed here that on the anode electrode, the majority of *N. europaea* perform aerobic ammonium oxidation, consume oxygen, and create an anoxic ammonium oxidation, consume oxygen, and create an anoxic environment for the minor population of *N. europaea* to conduct anaerobic ammonium oxidation that transfers electrons to the anode electrode. The presence of denitrifying bacteria on the anode electrode accelerates ammonium oxidation by taking up nitrite. Likewise, a microanaerobic condition is built up inside the cathode electrode through the consumption of oxygen by aerobic biofilm outside (see FIG. 9B). As a result, denitrifying bacteria reduce nitrite, the product of aerobic ammonium oxidation, partially by accepting electrons from the cathode electrode. The accumulation of nitrite indicates that ammonium removal may be due to partial nitrification. An increased anaerobic condition may improve efficiency of the electricity production.

Ammonium-fed MFCs described herein may be employed to remove ammonium nitrogen from wastewater and agricultural wastes under certain conditions (e.g., carbon-limited conditions). To achieve ammonium removal in MFCs, a pretreatment step that converts ammonium to nitrite may be used, similar to that in an anammox process. However, compared with anammox, the ammonium-fed MFC generates electricity as a surplus benefit and thus is more favorable for energy-consuming wastewater treatment.

While this document contains many specifics, these should not be construed as limitations on the scope of any invention or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A microbial fuel cell comprising:
    an anode;
    a cathode electrically coupled to the anode;
    a first fluid in contact with the anode, the first fluid comprising first microorganisms, wherein the first microorganisms are ammonia-oxidizing microorganisms that catalyze oxidation of ammonium;
    a second fluid in contact with the cathode, the second fluid comprising second microorganisms, wherein the second microorganisms are nitrite-reducing microorganisms that catalyze reduction of nitrite; and
    a biofilm on the cathode, the biofilm comprising ammonia-oxidizing organisms.

2. The microbial fuel cell of claim 1, wherein the anode and the cathode are housed in a single compartment, and the first fluid and the second fluid are the same.

3. The microbial fuel cell of claim 1, wherein the anode and the cathode are not separated by a membrane.

4. The microbial fuel cell of claim 1, wherein the anode and the cathode are separated by an anion exchange membrane.

5. The microbial fuel cell of claim 1, wherein the second microorganisms catalyze the reduction of nitrate.

6. The microbial fuel cell of claim 1, wherein the first microorganisms are anaerobic.

7. The microbial fuel cell of claim 1, wherein the cathode is configured to rotate with respect to the anode.

8. The microbial fuel cell of claim 1, wherein the cathode comprises a multiplicity of cathode elements connected in series.

9. The microbial fuel cell of claim 1, wherein the first microorganisms catalyze complete oxidation of ammonium to dinitrogen gas.

10. The microbial fuel cell of claim 1, wherein the microbial fuel cell is operable as a sequencing batch reactor.

11. The microbial fuel cell of claim 1, wherein the microbial fuel cell generates electricity.

12. A method of treating wastewater, the method comprising:
    providing wastewater comprising ammonium to a microbial fuel cell comprising:
        an anode;
        a cathode electrically coupled to the anode;
        a first fluid in contact with the anode, the first fluid comprising first microorganisms, wherein the first microorganisms are ammonia-oxidizing microorganisms that catalyze oxidation of ammonium;
        a second fluid in contact with the cathode, the second fluid comprising second microorganisms, wherein the second microorganisms are nitrite-reducing microorganisms that catalyze reduction of nitrite; and
        a biofilm on the cathode, the biofilm comprising ammonia-oxidizing organisms; and
    oxidizing some of the ammonium to form nitrite.

13. The method of claim 12, further comprising oxidizing some of the ammonium to form dinitrogen gas.

14. The method of claim 12, further comprising reducing some of the nitrite to form dinitrogen gas.

15. The method of claim 12, further comprising providing nitrite to the microbial fuel cell.

16. A method of generating electricity, the method comprising:
    providing ammonium to a microbial fuel cell comprising:
        an anode;
        a cathode electrically coupled to the anode;
        a first fluid in contact with the anode, the first fluid comprising first microorganisms, wherein the first microorganisms are ammonia-oxidizing microorganisms that catalyze oxidation of ammonium;
        a second fluid in contact with the cathode, the second fluid comprising second microorganisms, wherein the second microorganisms are nitrite-reducing microorganisms that catalyze reduction of nitrite; and
        a biofilm on the cathode, the biofilm comprising ammonia-oxidizing organisms; and
    biocatalyzing oxidation of some of the ammonium in the microbial fuel cell to generate electricity.

17. The method of claim 16, wherein providing ammonium to the microbial fuel cell comprises providing wastewater to the microbial fuel cell.

18. The method of claim 16, further comprising providing nitrite to the microbial fuel cell, and biocatalyzing reduction of some of the nitrite.

* * * * *